United States Patent
Draeger

(10) Patent No.: US 11,071,294 B1
(45) Date of Patent: Jul. 27, 2021

(54) LOW POWER INFLATABLE DEVICE

(71) Applicant: Dalen Products, Inc., Knoxville, TN (US)

(72) Inventor: William M. Draeger, Sevierville, TN (US)

(73) Assignee: Dalen Products, Inc., Knoxville, TN (US)

( * ) Notice: Subject to any disclaimer, the term of this patent is extended or adjusted under 35 U.S.C. 154(b) by 636 days.

(21) Appl. No.: 15/812,522

(22) Filed: Nov. 14, 2017

(51) Int. Cl.
*A01M 29/06* (2011.01)
*G09F 19/08* (2006.01)

(52) U.S. Cl.
CPC ............ *A01M 29/06* (2013.01); *G09F 19/08* (2013.01)

(58) Field of Classification Search
CPC ................................ A01M 29/06; G09F 19/08
See application file for complete search history.

(56) References Cited

U.S. PATENT DOCUMENTS

| | | | | |
|---|---|---|---|---|
| 2,029,813 A | * | 2/1936 | De Mey | F04D 29/544 415/208.2 |
| 2,154,313 A | * | 4/1939 | McMahan | F04D 29/541 415/210.1 |
| 2,273,458 A | * | 2/1942 | Anderson | F04D 29/464 415/23 |
| 2,350,187 A | | 5/1944 | Pfeiffer | |
| 2,674,403 A | * | 4/1954 | Whiton | F04D 29/464 415/156 |
| 2,911,745 A | * | 11/1959 | Simon | G09F 19/00 40/407 |

(Continued)

FOREIGN PATENT DOCUMENTS

| | | |
|---|---|---|
| CN | 202697555 U | 1/2013 |
| GB | 2156645 A | 10/1985 |

OTHER PUBLICATIONS

Derwent Abstract: Publication Date Jun. 5, 2012; CN 202971252—Ren, K. "Outdoor Solar Energy Fan, has Storage Battery Connected With Blowing Motor, Whic is Connected With Inverter and Outer Cover Provided With Air Outlet and Air Inlet of Wind Motor", Abstract & the Figure. (Year: 2012).*

*Primary Examiner* — Nimeshkumar D Patel
*Assistant Examiner* — Tania Courson
(74) *Attorney, Agent, or Firm* — Luedeka Neely Group, PC

(57) ABSTRACT

An inflatable device, having an air flow path having a circumference and including an air diverter comprising a central motor receiver and a plurality of air deflectors extending radially from the motor receiver and located to define a plurality of air flow chambers surrounding the motor receiver; a motor mounted within the central motor receiver and having an output shaft rotatable by the motor and extending below the air diverter, the motor generating heat during use of the motor; a fan connected to the output shaft of the motor and located below the air diverter for rotating in response to rotation of the output shaft by the motor to generate a flow of air, the air diverter cooperating with the flow of air generated by the fan to create a turbulent air flow directed to flow through the air flow chambers and past the motor, the flow of air providing cooling to dissipate heat from the motor; and an inflatable body in flow communication with the air flow path and located above the air diverter for receiving the turbulent air flow. The inflatable body undulates in response to receiving the turbulent air flow.

12 Claims, 10 Drawing Sheets

(56) References Cited

U.S. PATENT DOCUMENTS

| | | | | |
|---|---|---|---|---|
| 3,882,335 A * | | 5/1975 | Fries | H02K 9/20 310/61 |
| 4,171,937 A * | | 10/1979 | Greenfield | H02K 5/24 165/122 |
| 4,299,535 A * | | 11/1981 | Brockman | F04D 29/462 415/160 |
| 4,920,674 A * | | 5/1990 | Shaeffer | A63H 27/10 116/210 |
| 5,186,675 A | | 2/1993 | Stoddard | |
| 5,267,842 A * | | 12/1993 | Harmsen | F04D 25/0606 417/354 |
| 5,519,574 A * | | 5/1996 | Kodama | H01L 23/4093 165/122 |
| 5,839,205 A * | | 11/1998 | Hung | F04D 17/165 34/97 |
| 6,027,307 A * | | 2/2000 | Cho | F04D 29/164 415/173.5 |
| 6,186,857 B1 | | 2/2001 | Gazit et al. | |
| 6,244,818 B1 * | | 6/2001 | Chang | F01D 25/24 415/193 |
| 6,347,470 B1 | | 2/2002 | Radovich | |
| 6,382,808 B1 * | | 5/2002 | Lin | F21S 10/00 362/294 |
| 6,385,915 B1 | | 5/2002 | Keeler | |
| 6,386,276 B1 * | | 5/2002 | Chen | F04D 25/0613 165/121 |
| 6,428,185 B1 * | | 8/2002 | Lin | F21V 1/06 362/253 |
| 6,472,782 B1 * | | 10/2002 | Selci | B23Q 5/10 310/58 |
| 6,491,502 B2 * | | 12/2002 | Hunt | F04D 29/582 415/119 |
| 6,517,326 B2 * | | 2/2003 | Fujinaka | F04D 25/08 415/119 |
| 6,522,036 B1 * | | 2/2003 | Chen | H02K 9/18 310/58 |
| 6,547,540 B1 * | | 4/2003 | Horng | F04D 25/0613 361/695 |
| 6,804,905 B1 | | 10/2004 | Burger et al. | |
| 6,948,912 B2 * | | 9/2005 | Chang | F04D 29/384 416/185 |
| 6,955,440 B2 * | | 10/2005 | Niskanen | F21S 9/02 362/253 |
| 7,118,332 B2 * | | 10/2006 | Horng | F04D 29/544 415/208.2 |
| 7,198,538 B2 | | 4/2007 | Chin-Cheng | |
| 7,201,562 B2 * | | 4/2007 | Liu | F04D 25/0613 415/176 |
| 7,251,137 B2 * | | 7/2007 | Iijima et al. | F04D 13/0673 165/104.33 |
| 7,324,409 B1 * | | 1/2008 | Zweesaardt | A01M 29/06 367/139 |
| 7,356,951 B2 | | 4/2008 | Spielberger et al. | |
| 7,411,504 B2 * | | 8/2008 | Hanscom | A01M 31/002 340/384.2 |
| 7,614,171 B2 | | 11/2009 | Hsu | |
| 7,661,927 B2 * | | 2/2010 | Hsu | F04D 19/007 415/208.2 |
| 7,740,446 B2 * | | 6/2010 | Lin | F01D 1/02 415/199.4 |
| 7,778,032 B2 * | | 8/2010 | Yang | H01L 23/467 361/697 |
| 7,966,963 B1 * | | 6/2011 | Caldwell | A01M 29/06 116/22 A |
| 8,333,559 B2 * | | 12/2012 | Bushnell | F04D 29/544 415/211.2 |
| 8,597,672 B2 | | 12/2013 | Dunham | |
| 8,847,768 B2 * | | 9/2014 | Craven | A01M 29/16 340/573.2 |
| 8,851,955 B2 * | | 10/2014 | Zhang | A63H 13/18 446/176 |
| 8,935,988 B1 * | | 1/2015 | Perez | E01F 9/688 116/63 P |
| 8,992,175 B2 * | | 3/2015 | Heli | F04D 29/624 415/209.3 |
| 9,055,737 B2 | | 6/2015 | Matzel et al. | |
| 9,445,585 B2 | | 9/2016 | Dunham | |
| 9,534,501 B2 * | | 1/2017 | Hung | F01D 9/04 |
| 9,618,007 B2 * | | 4/2017 | Iyer | F04D 29/245 |
| 9,869,191 B2 * | | 1/2018 | Gallagher | F02K 3/06 |
| 2002/0094746 A1 * | | 7/2002 | Harley | A63H 3/001 446/178 |
| 2002/0145853 A1 * | | 10/2002 | Grouell | H05K 7/2019 361/695 |
| 2003/0013375 A1 | | 1/2003 | Austin | |
| 2005/0028720 A1 | | 2/2005 | Bell et al. | |
| 2005/0145162 A1 | | 7/2005 | Marcus | |
| 2006/0025037 A1 | | 2/2006 | Lau | |
| 2006/0072347 A1 * | | 4/2006 | Ferraro | F04D 29/601 417/199.1 |
| 2006/0098421 A1 * | | 5/2006 | Fireman | F04D 25/084 362/96 |
| 2009/0179759 A1 | | 7/2009 | Koury et al. | |
| 2009/0263238 A1 * | | 10/2009 | Jarrah | F04D 29/544 415/199.5 |
| 2010/0282344 A1 * | | 11/2010 | Carolan | G09F 15/0025 137/565.17 |
| 2013/0019585 A1 * | | 1/2013 | Merry | F01D 17/162 60/226.3 |
| 2013/0047477 A1 | | 2/2013 | Conner | |
| 2014/0148079 A1 | | 5/2014 | Zhang | |
| 2015/0135569 A1 | | 5/2015 | Kusanovich | |
| 2015/0223446 A1 | | 8/2015 | Vaaler | |
| 2019/0318673 A1 * | | 10/2019 | Newton | G09F 19/08 |

\* cited by examiner

LOW POWER INFLATABLE DEVICE

FIELD

This disclosure relates to powered inflatable devices. More particularly, this disclosure relates to undulating inflatable devices having improved airflow structures to enable low power requirements.

BACKGROUND

Improvement is desired in the construction of powered inflatable devices, and particularly powered undulating devices of the type used for advertisements and scarecrow devices.

One problem with conventional devices relates to motor size and power requirements. In particular, what is desired is a structure for an undulating inflatable device that enables use of a smaller motor that can be battery powered and have small enough power requirements to enable solar charging of the battery to be viable.

The structure of the present disclosure has been discovered to provide desired airflows to enable sufficient cooling of the motor to allow the use of a smaller motor so as to have sufficiently low power requirement to enable the use of a small battery that makes solar charging viable.

SUMMARY

The above and other needs are met by powered inflatable devices according to the disclosure. The devices are self-contained and suitable for use as scarecrow and advertising devices.

In one aspect, an inflatable device includes an air flow path having a circumference and including an air diverter having a central motor receiver and a plurality of air deflectors extending radially from the motor receiver and located to define a plurality of air flow chambers surrounding the motor receiver. A motor is mounted within the central motor receiver and has an output shaft rotatable by the motor and extending below the air diverter. The motor generates heat during use of the motor. A fan is connected to the output shaft of the motor and is located below the air diverter for rotating in response to rotation of the output shaft by the motor to generate a flow of air.

The air diverter cooperates with the flow of air generated by the fan to create a turbulent air flow directed to flow through the air flow chambers and past the motor, the flow of air providing cooling to dissipate heat from the motor. The device includes an inflatable body in flow communication with the air flow path and located above the air diverter for receiving the turbulent air flow. The inflatable body undulates in response to receiving the turbulent air flow.

In another aspect, an inflatable scarecrow device includes an air flow path having a circumference and including an air diverter having a central motor receiver and three air deflectors extending radially from the motor receiver and located to define three air flow chambers surrounding the motor receiver.

One of the air flow chambers occupies about 25 percent of the flow path and the other two air flow chambers each occupy about one half of the remaining flow path. The device also includes solar panel; a rechargeable battery in electrical communication with the solar panel; and a direct current motor in electrical communication with the battery. The motor is mounted within the central motor receiver and has an output shaft rotatable by the motor and extending below the air diverter. The motor generates heat during use of the motor.

A fan is connected to the output shaft of the motor and located below the air diverter for rotating in response to rotation of the output shaft by the motor to generate a flow of air. The air diverter cooperates with the flow of air generated by the fan to create a turbulent air flow directed to flow through the air flow chambers and past the motor. The flow of air provides cooling to dissipate heat from the motor.

An inflatable scarecrow body is in flow communication with the air flow path and located above the air diverter for receiving the turbulent air flow. The inflatable scarecrow body undulates in response to receiving the turbulent air flow.

BRIEF DESCRIPTION OF THE DRAWINGS

Further advantages of the disclosure are apparent by reference to the detailed description when considered in conjunction with the figures, which are not to scale so as to more clearly show the details, wherein like reference numbers indicate like elements throughout the several views, and wherein.

DETAILED DESCRIPTION

Figure 1:
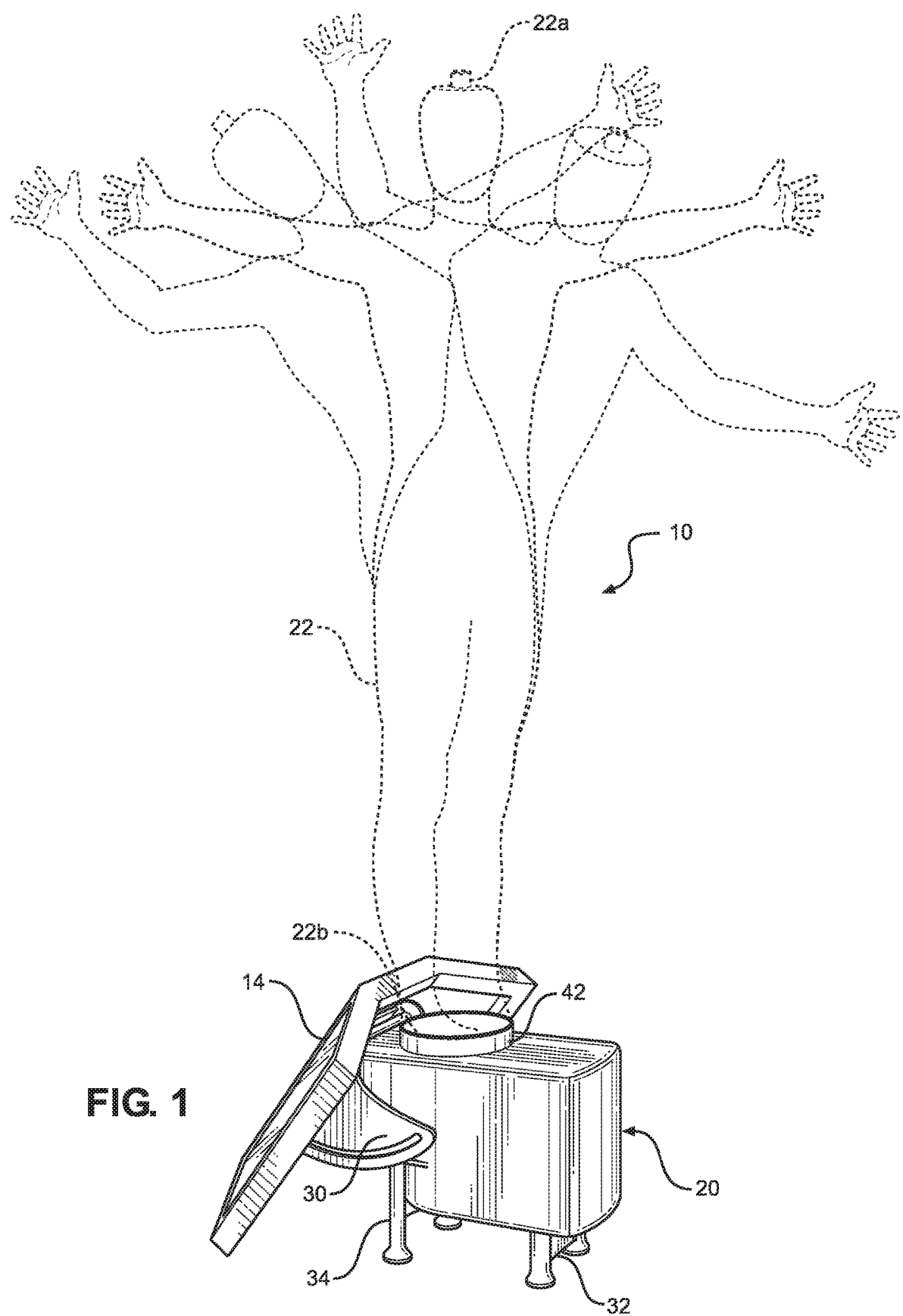
FIG. 1 is a perspective view of a solar powered undulating inflatable device having improved airflow and cooling according to the disclosure.
Figure 2:
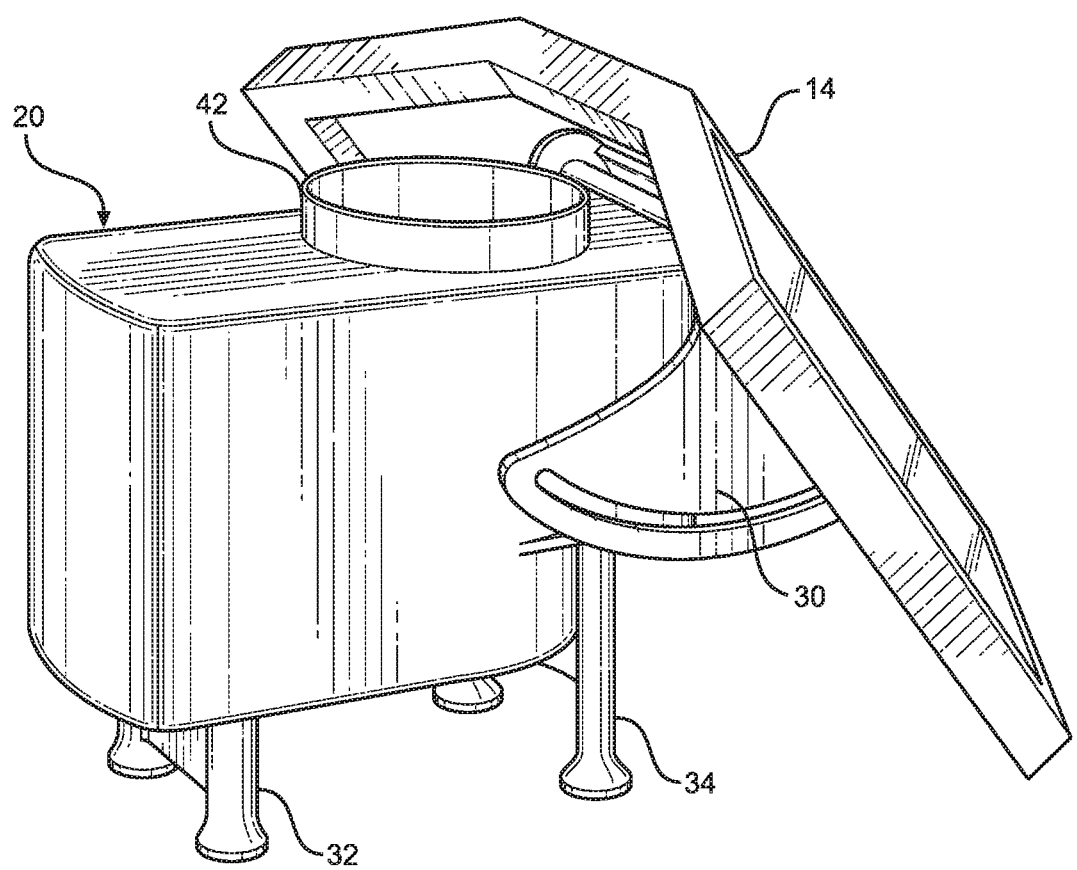
FIGS. 2-4 are assembled views of the solar powered device of FIG. 1.
Figure 3:
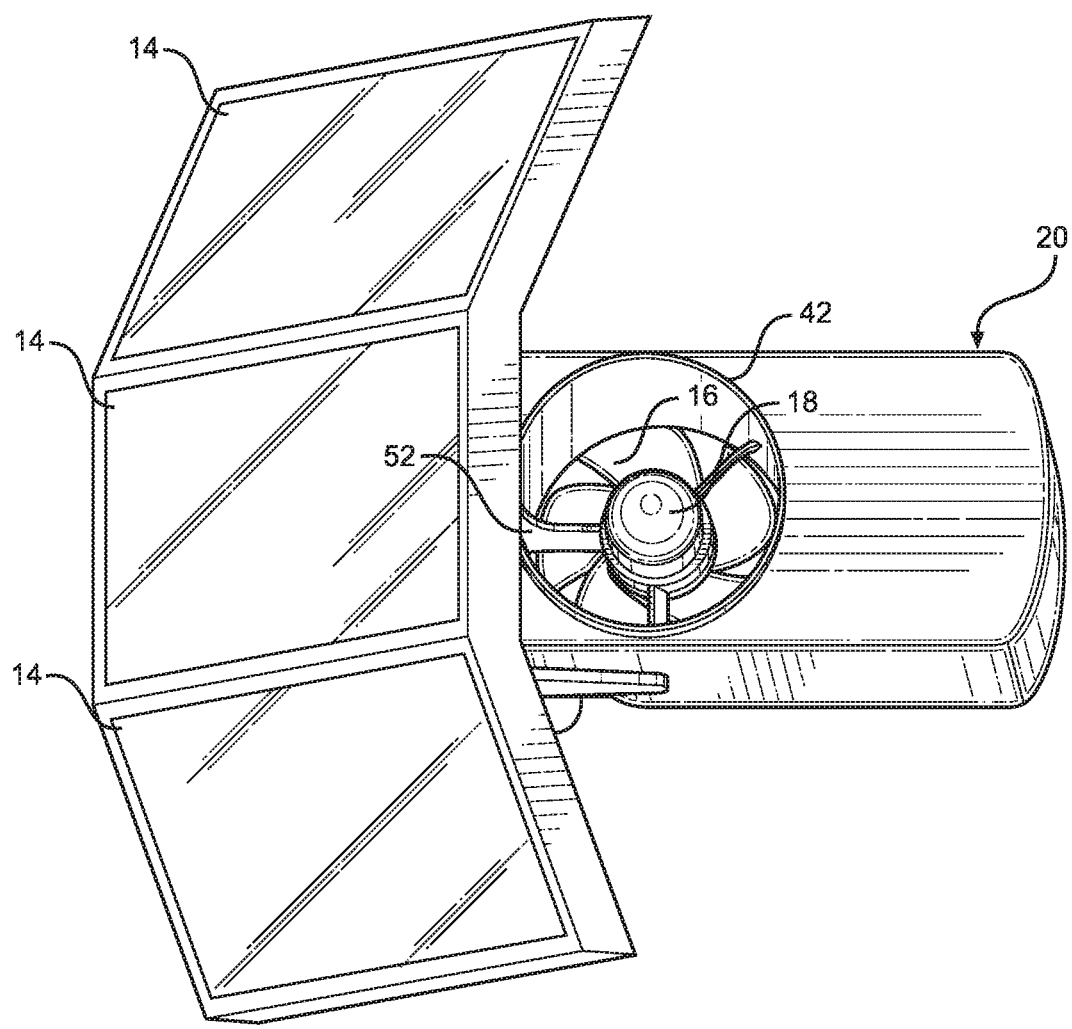
Figure 4:
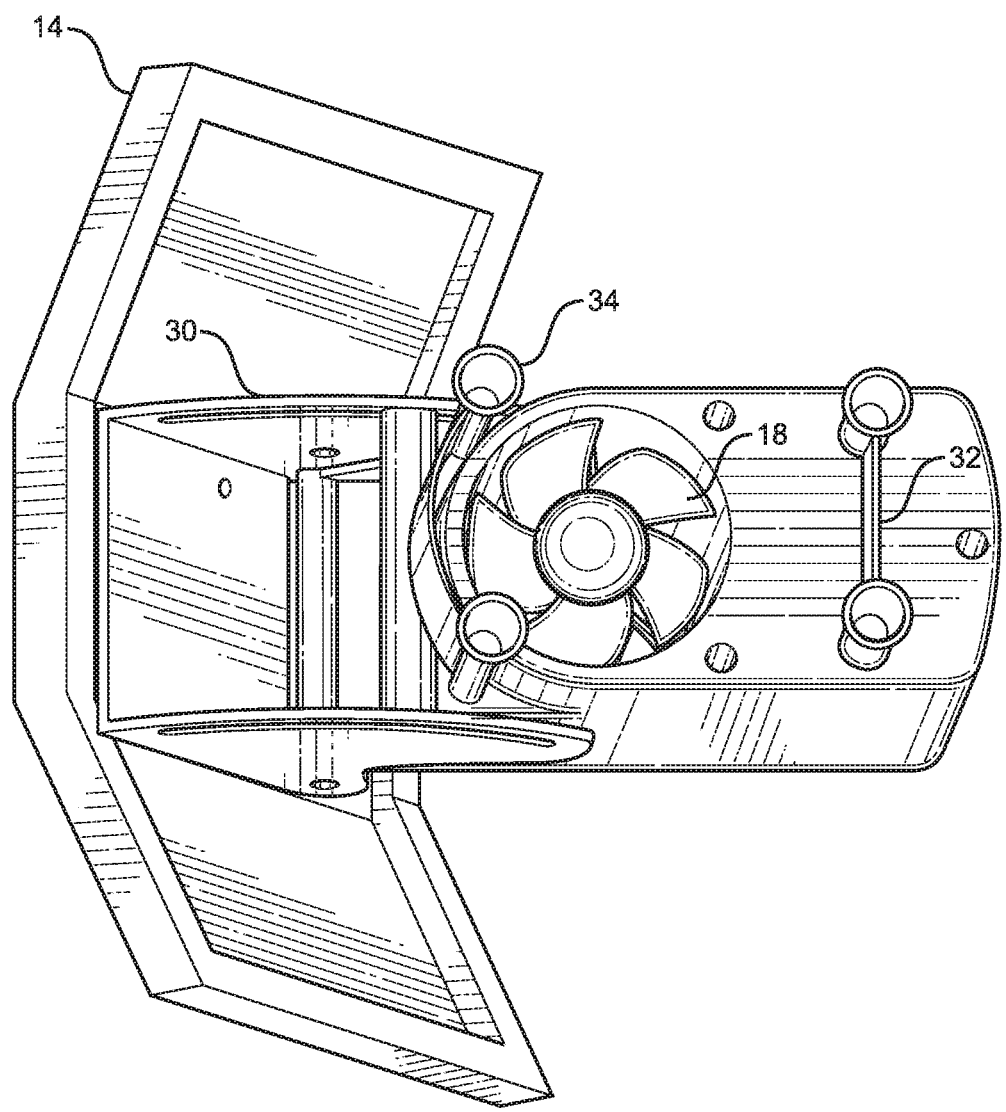
Figure 5:
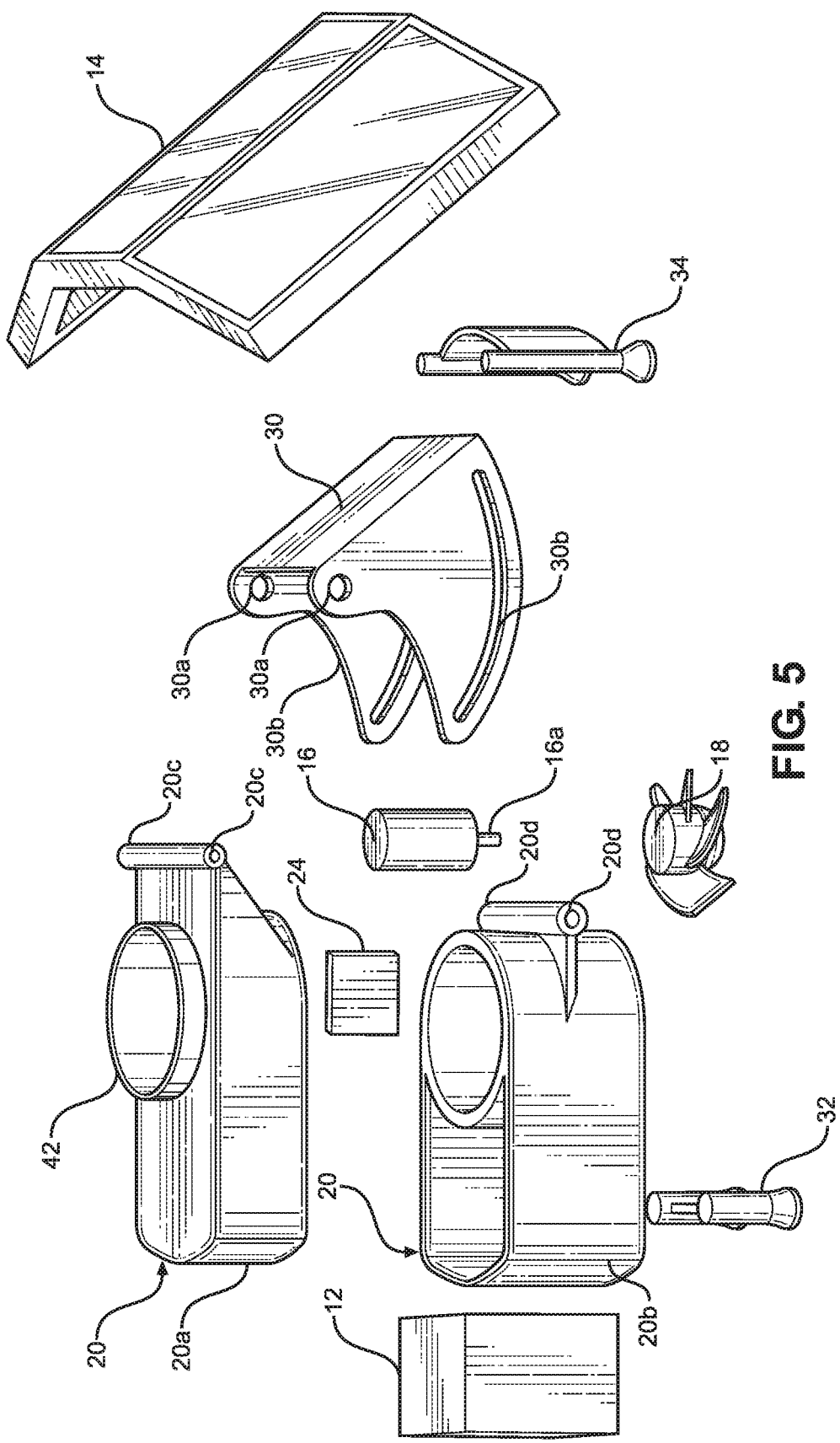
FIGS. 5 and 6 are exploded views of the solar powered device of FIG. 1.
Figure 6:
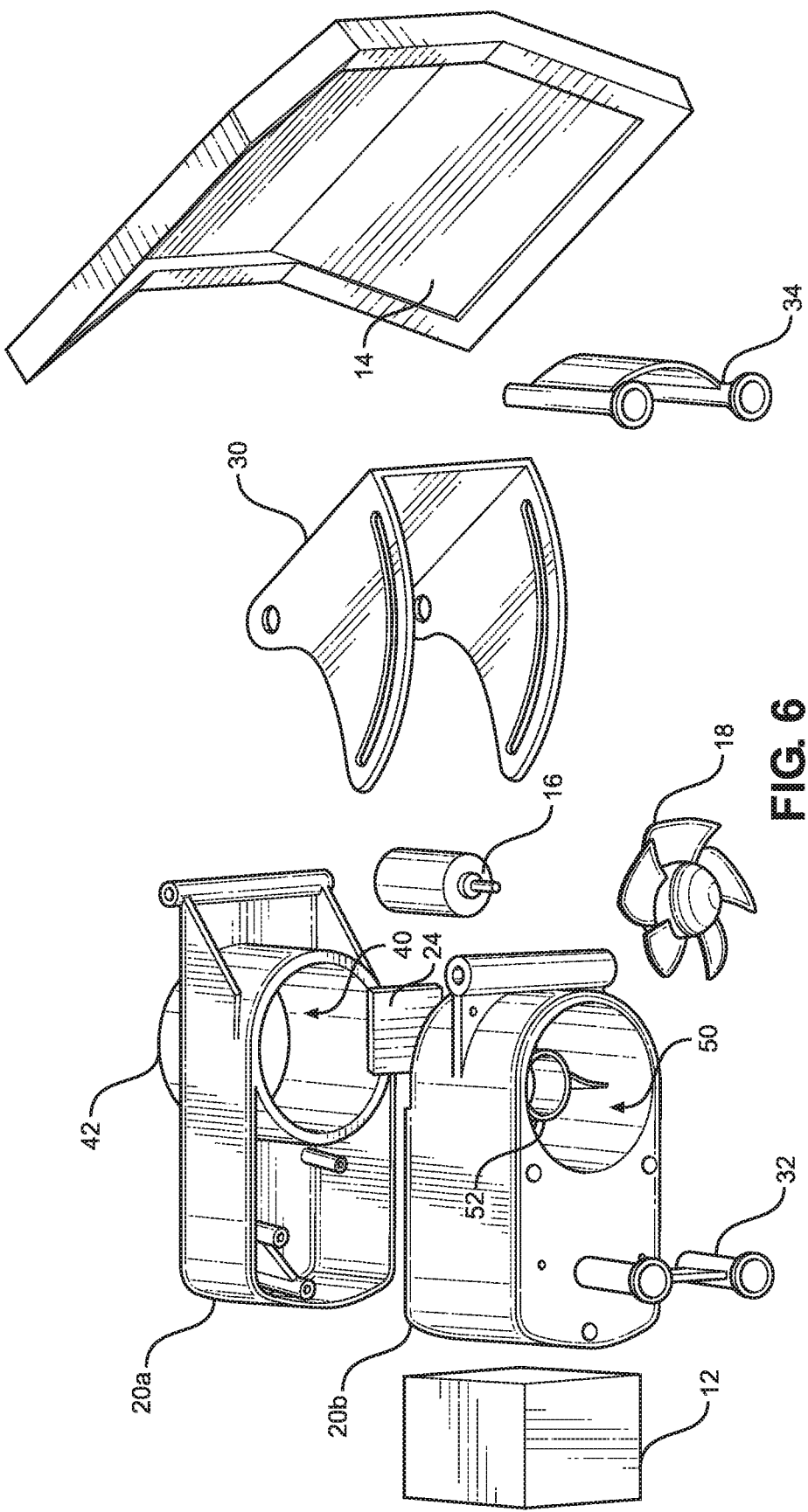
Figure 7:
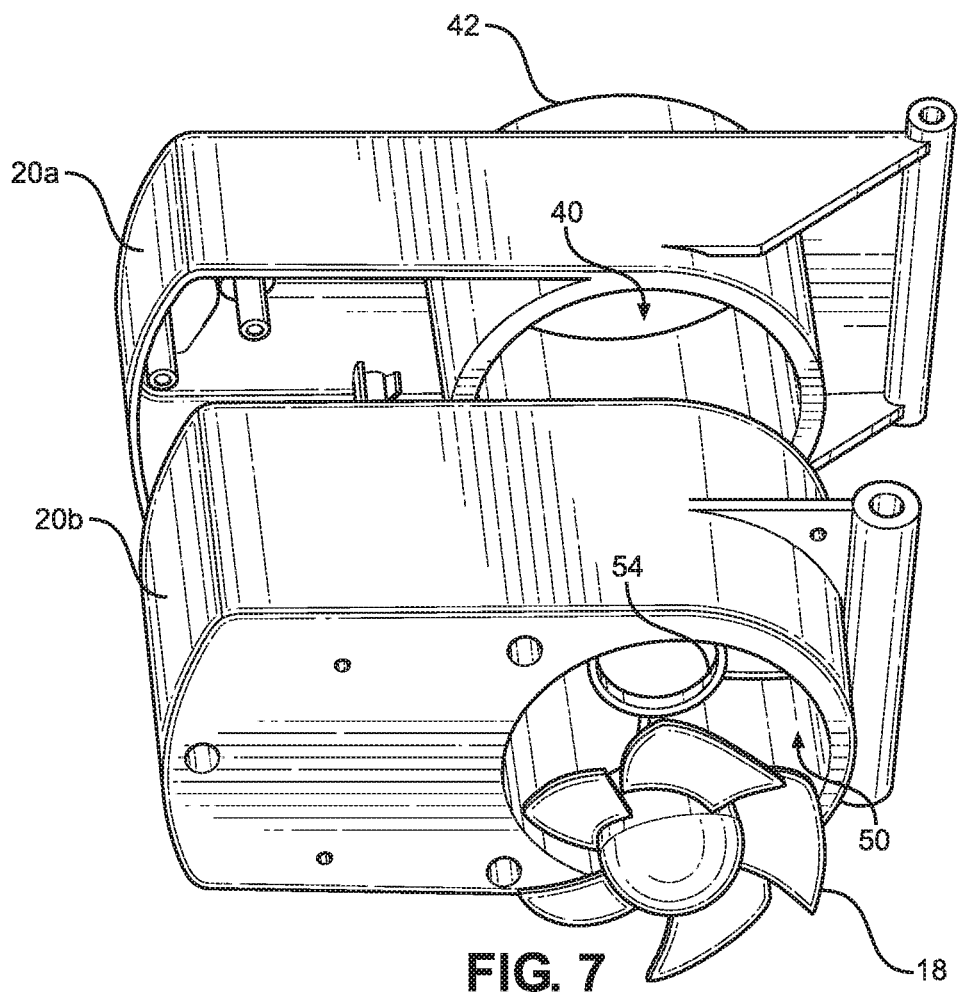
FIG. 7 is an exploded view of the motor housing of the solar powered device of FIG. 1.
Figure 8:
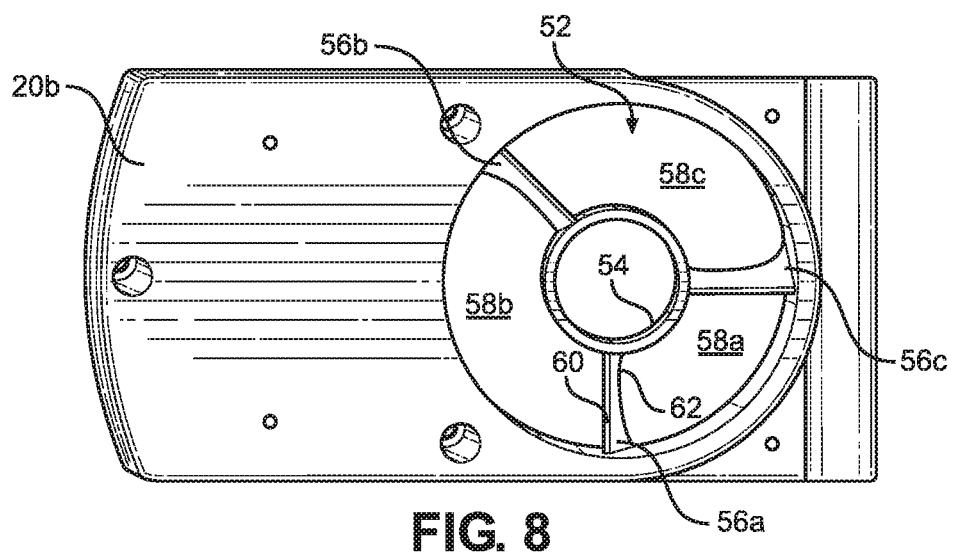
FIG. 8 is a lower view of the motor housing of the solar powered device of FIG. 1.

With reference to the drawings, there is shown a powered inflatable device 10 according to the disclosure. As shown, the device is a solar charged battery powered device. The device 10 includes a battery 12, a solar panel 14, a motor 16, fan blades 18, a housing 20, an inflatable body 22, and an electronic controller 24.

The device 10 includes unique airflow structures that provide a turbulent airflow suitable for inflating the inflatable body 22 in a manner so that the inflatable device undulates and moves. The structures also advantageously provide a cooling airflow over the motor to cool the motor. Cooling of the motor enables the use of a smaller motor that can be battery powered and have sufficiently low power requirements to enable solar charging of the battery as the sole source of power. That is, a smaller motor has to run almost continuously to maintain adequate airflow to enable the inflatable body 22 to undulate. Continuous running will often cause the motor to overheat. Thus, the provision of a cooling air flow over the motor helps to avoid overheating and enables the use of the smaller motor. The smaller motor has lower power requirements and thus enables the use of a battery powered motor that may be adequately charged by use of a small solar panel.

The device 10 as shown is configured to be suitable for use as a garden scarecrow. Thus, the components as dimensioned below are suitable for this purpose. It will be appreciated that the device 10 may be scaled to be suitable for other purposes.

The battery 12 is desirably a rechargeable battery, preferably a 12 volt lead acid 6.6 mah battery, and the solar panel 14 is preferably a 10 watt, 0.55 amp, 18 volt solar array. The motor 16 includes a rotating shaft 16a for connecting to the fan blades 18. A preferred motor to provide the motor 16 is a 12 volt, 2.7 amp direct current motor. The fan blades 18 are sized to fit the housing, as described below.

The housing 20 is configured to have an upper housing 20a and a lower housing 20b. The housing 20 is provided in two pieces to facilitate location of the battery 12, the motor 16, the fan 18 and the electronic controller 24 within the housing 20.

An adjustable solar panel mount 30 connects between the housing 20 and the solar panel 14 to enable the angle of the solar panel 14 to be adjusted to facilitate positioning of the solar panel 14 relative to the sun to optimize exposure of the solar panel 14 to the sun.

The mount 30 includes pivot apertures 30a and slots 30b which mate with receivers 20c and 20d located on the housings 20a and 20b, respectively. Legs 32 and 34 connect to the lower housing 20b to elevate the housing 20 above the ground to facilitate air intake into the housing 20.

The upper housing 20a includes a cylindrical open flow path 40 that is disposed above the location of the motor 16 and exits the housing 20a to provide a rim 42 onto which the inflatable body 22 may be connected to enable air flow communication between the flow path 40 and the inflatable body 22.

The lower housing 20b includes a cylindrical flow path 50 aligned with and below the flow path 40. The flow path 50 and the flow path 40 desirably have the same diameter. Within the flow path 50 is disposed a flow diverter 52 having a central tubular motor receiver 54 and a plurality of air deflectors 56a, 56b, and 56c. The air deflectors 56a-56c are located to define air flow chambers 58a, 58b, and 58c.

The motor 16 is mounted within the motor receiver 54 and above the air deflectors 56a-56c, with the fan blades 18 below the air deflectors 56a-56c. This arrangement, as described more fully below, provides a non-uniform or turbulent airflow that desirably provides an undulating motion to the inflatable body 22, and also provides a cooling flow of air over the motor 16.

For the described battery 12 and the motor 16, the flow path 50 has a length of about 4 inches and a diameter of about 8.5 inches. The flow path 40 is similarly sized, and the inflatable body 22 connects to the rim 42. The inflatable body 22 may be of irregular cross section to provide a desired exterior shape, but, generally has an internal diameter of about 4.25 inches and a length of about 60 inches.

Figure 9:
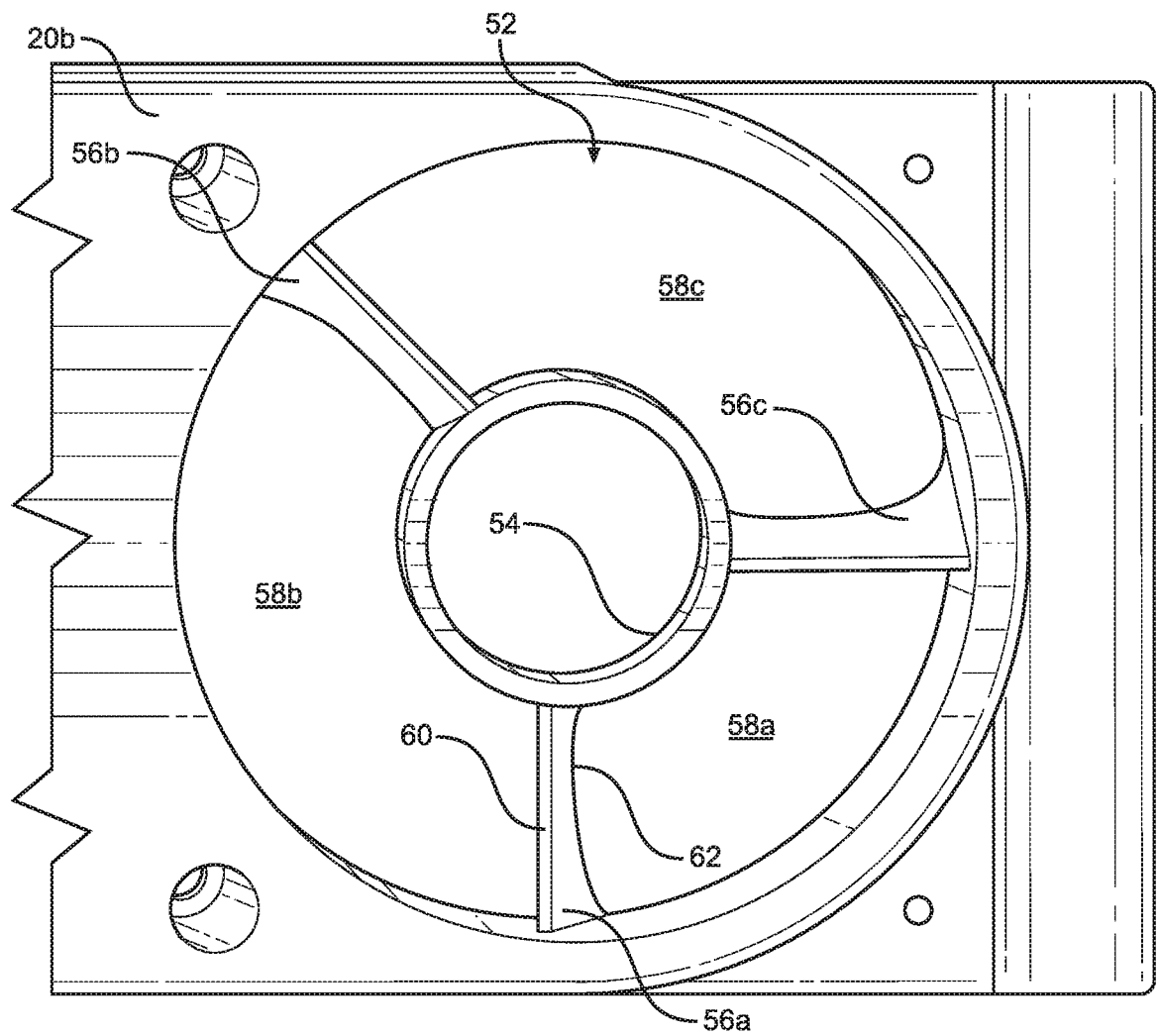
FIG. 9 is a close-up view of airflow chambers of the device of FIG. 1.

The desired turbulent air flow for undulation of the inflatable body 22 and cooling of the motor 16 is provided by the configuration of the flow diverter 52. The air deflectors 56a-56c are each configured as curved wings as best seen in FIG. 9. The angle of curvature is designated as angle A in FIG. 10. The angle of curvature A is selected to range from 15 to 30 degrees, most preferably about 21 degrees.

Figure 10:
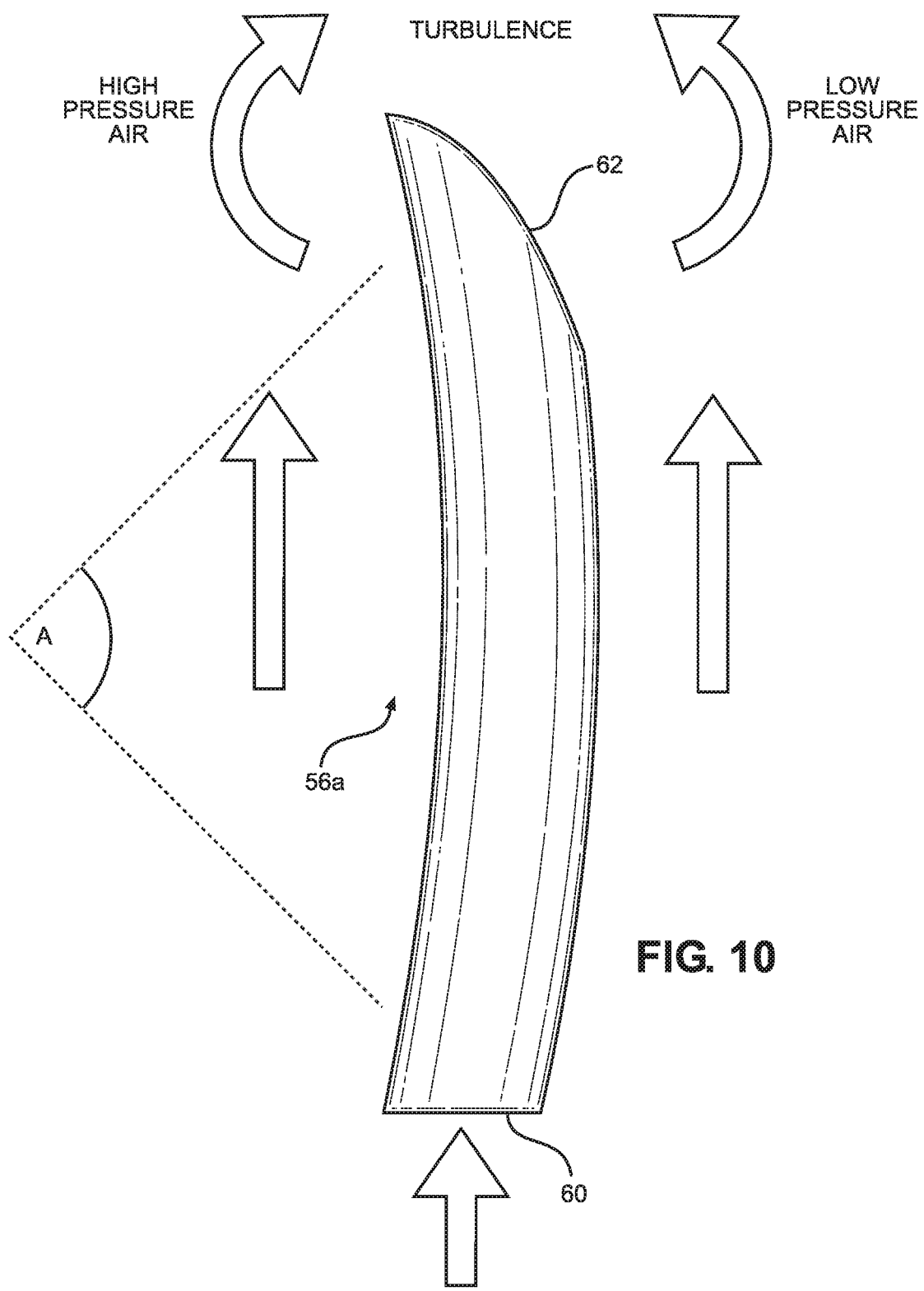
FIG. 10 depicts airflow associated with the device of FIG. 1.

The deflectors 56a-56c are 50% thicker on a leading edge 60 than on a trailing edge 62. This creates non-uniform air flow thru the deflector. The trailing edge 62 is also desirably flattened and curved into the circumference of the tubular motor receiver 54 to allow both high and low pressure air exiting the diverter 52 to interact smoothly, as depicted in FIG. 10, with the arrows representing air flow. FIG. 10 is a cross-sectional view of the deflector 56a, it being understood that each of the deflectors 56a-56c is similarly configured, except for its location.

The deflectors 56a-56c are situated below the motor 16 and above the fan blades 18. The deflectors 56a-56c are located to define the air flow chambers 58a-58c in proportion to the circumference of the flow path 50. In this regard, flow chamber 58a occupies about 25% of the circumference of the flow path 50. Flow chambers 58b and 58c are 37.5% of the circumference of the flow path 50. Thus, for the flow path 50 having a diameter of 8.5 inches, yielding a circumference of 26.7 inches, the flow chamber 58a occupies 6.7 inches of the circumference, and the flow chambers 58b and 58c each occupy 10 inches of the circumference.

It has been observed that the described flow structure enhances the turbulent effect by allowing the air from each of the flow chambers 58a-58c to exit at different speeds in relation to each other. This, in turn creates further turbulence. This turbulence is made unsteady by travel of the air upward through the inflatable body 22 and out of the inflatable body 22 via an exhaust tube 22a of the inflatable body 22, allowing more air to pass as the tube 22a is extended. This increases the air flow and lowers the air pressure in the inflatable body 22 and the inflatable body 22 deflates and falls. This then increases the air pressure in the inflatable body 22 due to collapse of the inflatable body 22 and the exhaust tube 22a which at least partially blocks air flow through the inflatable body 22. This blocking of air flow then results in inflation of the inflatable body 22, with this cycle of inflation/deflation repeating to result in an undulating motion of the inflatable body 22. The inflatable body 22 has a lower opening 22b that connects to the rim 42 to provide flow communication between the inflatable body 22 and the flow path 40 and flow path 50.

The overall structure described herein advantageously provides a larger effective surface area of air both over the motor 16 as well as through the inflatable body 22. This in turn allows for the use of a smaller motor, and efficient cooling thereof. This allows the use of a smaller battery, enabling solar charging of the battery to be utilized.

It has been observed that providing the deflectors 56a-56c at curvatures above about 30 degrees results in a significant and undesirable loss of air flow. Also, curvatures of the deflectors 56a-56c below about 15 degrees results in an undesirable non-turbulent air flow and a slowing of inflation of the inflatable body 22. Changing the ratios between the chambers 58a-58c was observed to only have an effect when all were equal. This resulted in a slower filling of the inflatable body 22. This lessening of the airflow along with the lessening of the turbulence was also observed to cause less effective surface area around the motor 16, reducing the cooling efficiency of the fan. Thus, the described configuration was observed to yield optimum results of both airflow and cooling.

Figure 11:
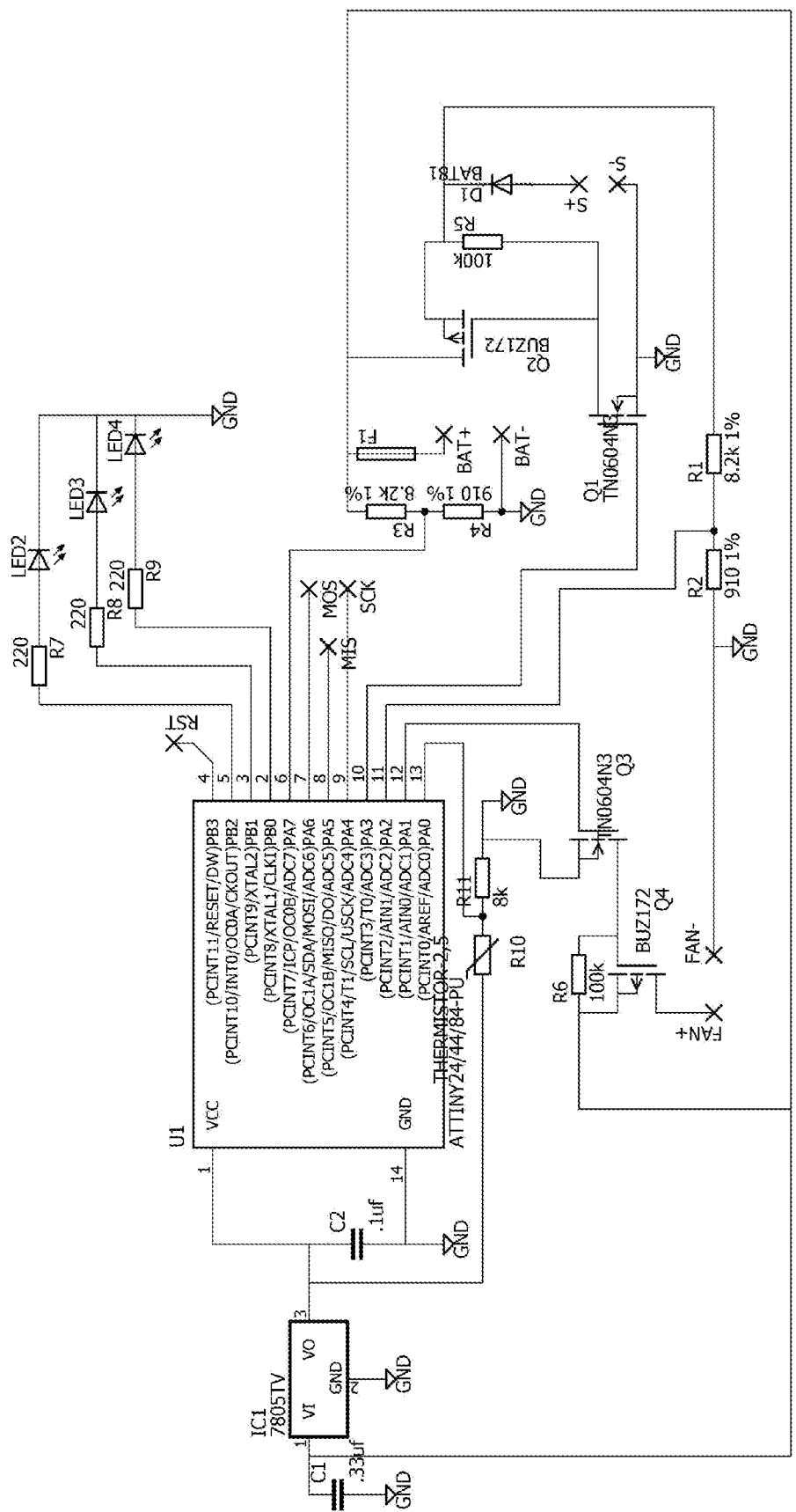
FIG. 11 shows a circuit diagram for an electronic controller of the device of FIG. 1.

The electronic controller 24 may be of various configurations. A schematic of a circuit for one example of a suitable configuration of the electronic controller 24 is provided in FIG. 11. The electronic controller 24 is configured to control the operation of the motor and run the motor 16 during daylight hours and to interface between the solar panel and the battery to charge the battery during daylight hours. The controller 24 is also configured to turn off the motor during darkness, or when the battery is below a threshold level. The controller 24 may also be configured to cooperate with a motion sensor to control operation of the device 10 in response to motion.

The foregoing description of preferred embodiments for this disclosure has been presented for purposes of illustration and description. It is not intended to be exhaustive or to limit the disclosure to the precise form disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. An inflatable device, comprising:
an air flow path having a circumference and including an air diverter comprising a central motor receiver and a plurality of air deflectors extending radially from the motor receiver and located to define a plurality of air flow chambers surrounding the motor receiver;
a motor mounted within the central motor receiver and having an output shaft rotatable by the motor and extending below the air diverter, the motor generating heat during use of the motor;
a fan connected to the output shaft of the motor and located below the air diverter for rotating in response to rotation of the output shaft by the motor to generate a flow of air, the air diverter cooperating with the flow of air generated by the fan to create a turbulent air flow directed to flow through the air flow chambers and past the motor, the flow of air providing cooling to dissipate heat from the motor; and
an inflatable body in flow communication with the air flow path and located above the air diverter for receiving the turbulent air flow, wherein the inflatable body undulates in response to receiving the turbulent air flow.

2. The device of claim 1, wherein the plurality of air deflectors comprises three air deflectors that define three air flow chambers.

3. The device of claim 2, wherein one of the air flow chambers occupies about 25 percent of the flow path and the other two air flow chambers each occupy about one half of the remaining flow path.

4. The device of claim 1, wherein the air deflectors are configured as curved wings having an angle of curvature of from about 15 to about 30 degrees.

5. The device of claim 1, wherein the air deflectors each have a leading edge having a thickness and a trailing edge having a thickness, with the thickness of the leading edge being about 50 percent greater than the thickness of the trailing edge.

6. The device of claim 1, wherein the motor comprises a direct current motor.

7. The device of claim 1, further comprising a battery to power the motor, a solar panel to charge the battery, and an electronic controller configured to control the operation of the motor and to interface between the solar panel and the battery to charge the battery.

8. An inflatable scarecrow device, comprising:
an air flow path having a circumference and including an air diverter comprising a central motor receiver and three air deflectors extending radially from the motor receiver and located to define three air flow chambers surrounding the motor receiver, one of the air flow chambers occupies about 25 percent of the flow path and the other two air flow chambers each occupy about one half of the remaining flow path;
a solar panel;
rechargeable battery in electrical communication with the solar panel;
a direct current motor in electrical communication with the battery and the motor being mounted within the central motor receiver and having an output shaft rotatable by the motor and extending below the air diverter, the motor generating heat during use of the motor;
a fan connected to the output shaft of the motor and located below the air diverter for rotating in response to rotation of the output shaft by the motor to generate a flow of air, the air diverter cooperating with the flow of air generated by the fan to create a turbulent air flow directed to flow through the air flow chambers and past the motor, the flow of air providing cooling to dissipate heat from the motor; and
an inflatable body in flow communication with the air flow path and located above the air diverter for receiving the turbulent air flow, wherein the inflatable body undulates in response to receiving the turbulent air flow.

9. The device of claim 8, wherein the air deflectors are configured as curved wings having an angle of curvature of from about 15 to about 30 degrees.

10. The device of claim 8, wherein the air deflectors each have a leading edge having a thickness and a trailing edge having a thickness, with the thickness of the leading edge being greater than the thickness of the trailing edge.

11. The device of claim 10, wherein the thickness of the leading edge is about 50 percent greater than the thickness of the trailing edge.

12. The device of claim 8, further comprising an electronic controller configured to control the operation of the motor and to interface between the solar panel and the battery to charge the battery.

* * * * *